Feb. 5, 1935. H. L. LINDEMANN 1,990,436
CONVERTIBLE AUTOMOBILE BODY
Filed Dec. 18, 1933 2 Sheets-Sheet 1
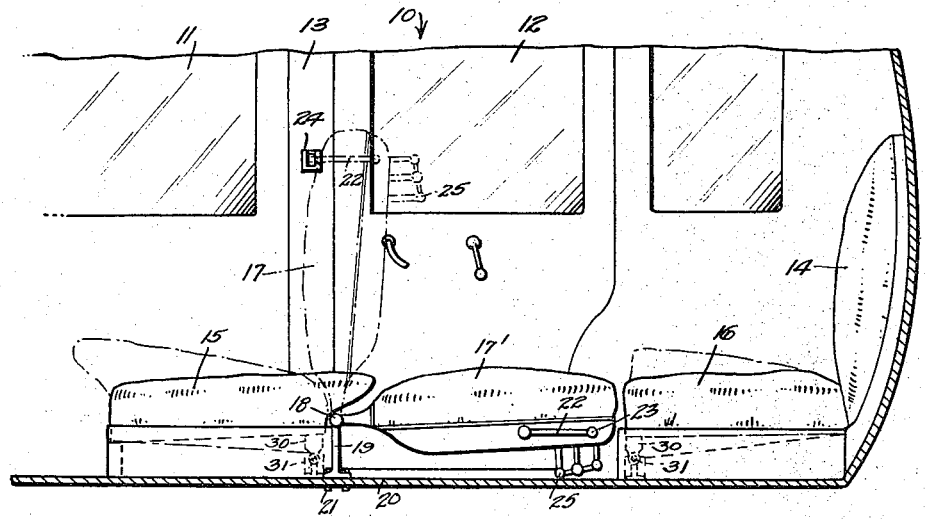
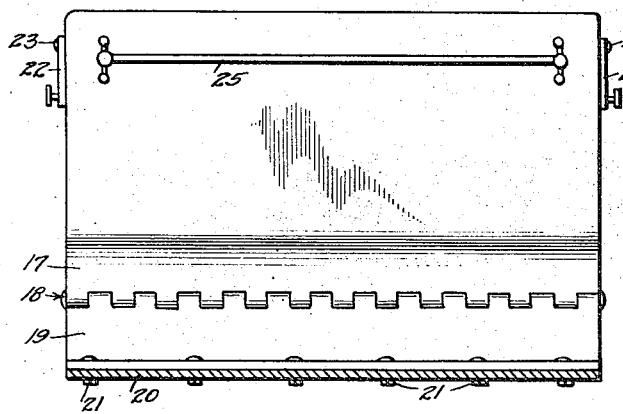
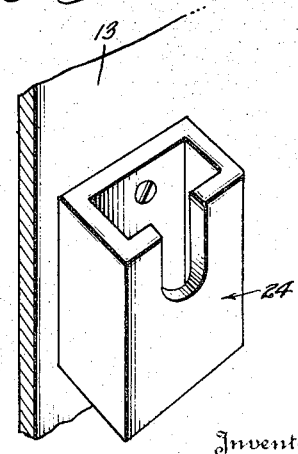
Inventor
Herman L. Lindemann
By Miller & Miller
Attorneys

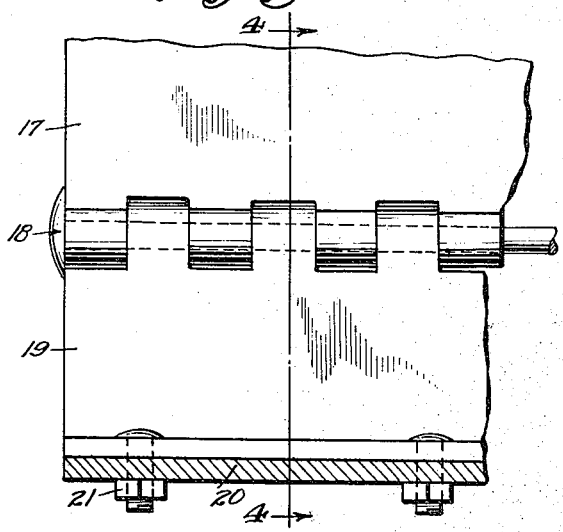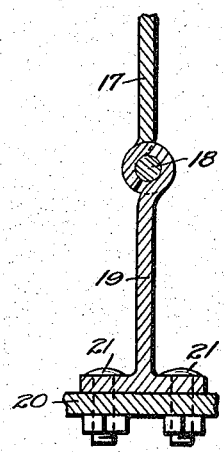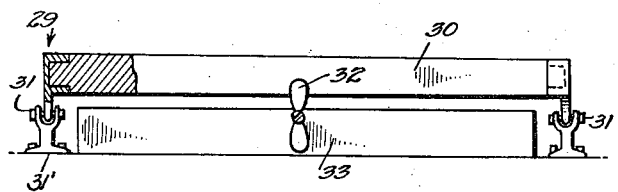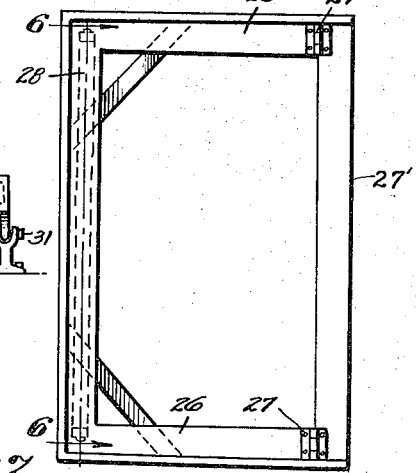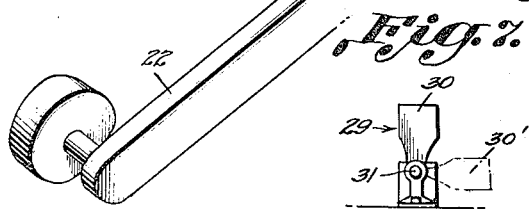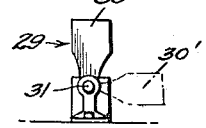

Patented Feb. 5, 1935

1,990,436

UNITED STATES PATENT OFFICE 1,990,436

CONVERTIBLE AUTOMOBILE BODY

Herman L. Lindemann, New Albany, Ind.

Application December 18, 1933, Serial No. 703,009

3 Claims. (Cl. 155—7)

This invention relates to a convertible automobile body, and has for an object to provide an improved convertible automobile body wherein the seat may be quickly and easily converted into a sleeping compartment.

A further object of this invention is to provide a convertible automobile body wherein the seat may be provided at the conventional normal angle to the horizontal for ordinary use and wherein the front seat back may be folded to a substantially level horizontal position, and the front and rear seats may have their angle changed so as to be in the same horizontal level as the seat back and may cooperate with each other to provide a substantially level horizontal bed.

A further object of this invention is to provide an automobile body which may be converted into a sleeping compartment and wherein the seat back and seats may cooperate with each other so as to form a horizontal level bed or support for sleeping or resting purposes.

A further object of this invention is to provide a convertible automobile body which when in normal use looks exactly like an ordinary automobile body with the seats at the normal conventional angle and is not unsightly and which may be quickly and easily converted into a sleeping compartment with the angle of the seats and the seat backs changed so as to provide a continuous level and horizontal bed or support, making the automobile especially suitable for long trips, enabling the passengers to travel where they will and always have sleeping accommodations instantly avaliable no matter where they stop at night.

Still a further object of this invention is to provide a convertible automobile body which may be so quickly and easily converted into a sleeping compartment that it is suitable for emergency use as an ambulance, enabling a sick or injured person to be transported as necessary without waiting for an ambulance to arrive.

With the foregoing and other objects in view, as will hereinafter become apparent, this invention comprises the constructions, combinations and arrangements of parts hereinafter set forth, disclosed and shown on the accompanying drawing. In this drawing, Figure 1 is a vertical sectional view through the body of an automobile showing the seats adjusted for sleeping purposes, the broken lines representing normal positions of the cushions, Figure 2 is an elevation of the back of the front seat, Figure 3 is an enlarged fragmentary view of the same, Figure 4 is a sectional view taken on the line 4—4 of Figure 3, Figure 5 is a top plan view of one of the seat supports, Figure 6 is a front view of the seat support adjusting means taken on the line 6—6 of Figure 5, Figure 7 is a side elevation of the seat support adjusting means of Figure 6, Figure 8 is a perspective view of the end of one of the locking arms pivoted on either side of the front seat, and Figure 9 is a perspective view of the slotted bracket for receiving the said arm.

There is shown at 10 a conventional automobile body of the sedan type having front and rear doors 11 and 12 separated by the door post 13. The front and rear seats and seat backs are provided as usual, the rear seat back 14 being conventional. In the up-to-date conventional automobile of today, the front and rear seats are normally low and at an angle to the horizontal, as shown in dot dash outline at 15 and 16, the front seat back 17 cooperating with the front seat 15 in the usual manner. When in these positions the interior of this improved convertible automobile body appears quite conventional and not at all unsightly.

The front seat back 17 is hingedly secured by means of a pintle 18 to a support 19 secured to the automobile body 20 as by bolts 21. To retain the seat back 17 in the vertical or upright position, it is provided with a pair of locking arms 22 pivotally secured thereto as at 23, while the opposite door posts 13 are provided with brackets 24 so as to receive and firmly secure the ends of the locking arms 22 therein and hold the seat back 17 in the vertical or upright position. Adjacent its upper end the seat back 17 is provided with a rail customarily used as a robe rail 25.

This robe rail 25 and the supports 19 are so proportioned to each other that when the locking arms 22 are released from the bracket 24 and the seat back 15 folded over to the horizontal position 17', the robe rail 25 and the seat hinge support 19 will maintain the seat back in a substantially horizontal and level position. In order to complete the conversion of the automobile body into a sleeping compartment, it is necessary that the seats 15 and 16 be brought to the same level horizontal position as the seat back when at 17', for otherwise they would not form a continuous level bed surface as is desirable.

The front and rear seats 15 and 16 are each supported on a frame member 26, the frame member 26 being hinged along one side to a supporting sill 27' as at 27 and being supported along an opposite side 28 by an adjustable bracket or support 29. The bracket or support 29 consists of a bar 30 hinged at its opposite ends to a pair of supporting columns 31' as at 31, the hinging means 31 being such that the brackets 29 can remain only either in the upright position, shown in full lines in Figure 7, or in the folded over position, shown in dotted lines at 30'.

A latch 32 pivoted to a block 33 below the bar 30 may be operated to maintain the bar 30 in upright position and prevent it from being moved to the folded over position 30' until the latch 32 is rotated.

When in use for normal seating purposes the bracket 29 is maintained with the bar 30 in the upright position, thus maintaining the seat frame 26 in such a position that the seats 15 and 16 will remain at the normal angle to the horizontal or to the conventional riding position. In order to convert this automobile body into a sleeping compartment it is only necessary to release the locking arms 22 from the brackets 24 and fold over the seat back 17 to the level horizontal position 17', to remove the front seat cushions 15, pivot its latch 32 so as to permit its bracket 29 to be folded to the position 30', to reverse and replace the seat cushion 15 in the position 15' to rest on its block 33 and likewise lower the bracket under the rear seat 16 to the folded over position 30', thus permitting the rear seat 16 to drop to the position 16' to rest on its block 33, it being observed that the front and rear seats when in position 15' and 16' are in the same level and horizontal position as the seat back 17', thus providing a level and continuous bed surface or support, and allowing the same to be used as a sleeping compartment. The conversion of this automobile body from the conventional position to the sleeping compartment position can be done very quickly and easily as will be obvious from the above description, and in case of an emergency the same can be used as an ambulance to transport a sick or wounded person, it being obvious that the automobile can be driven quite easily while the front seat is in the position 15', without the use of the seat back 17.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. In an automobile body having front and rear seats normally at an angle to the horizontal, in combination, a hinged seat back releasably secured at its upper end to the body, a rail fixedly secured to the back of said seat back adjacent its upper end, a support, a hinge connecting the lower end of the seat back to said support, said seat back being adapted to be folded about said hinge to a horizontal position, said rail on said seat back and said support being of such a size as to support the seat back in folded position at a substantially level horizontal position, means for individually supporting each of the front and rear seats in the same level horizontal position as said folded horizontal seat back, said means comprising frames for supporting the seats at the normal angle to the horizontal, means for adjustably holding said frames at different positions, said adjustable supporting means each comprising a hinged bracket under one end of said seat frame, and means for securing said hinged bracket in a high position, said securing means comprising a block beneath said hinged bracket, and a latch on said block, said hinged bracket being foldable to a low position whereby said block may act as a support for said frame.

2. In an automobile body having front and rear seats normally at an angle to the horizontal, in combination, a seat back, means releasably supporting said seat back in a vertical position, means for releasing said seat back from the vertical position and supporting it in a level substantially horizontal position, means for adjustably individually supporting each of the front and rear seats in their normal position at an angle to the horizontal, or in the same level horizontal position as the released seat back, each of said seat supporting means comprising a frame member hinged at one side and an adjustable hinged support for the opposite side of said frame member, said adjustable support being adapted to support said frame member in an upper position, a block beneath said adjustable support, a latch on said block holding said adjustable support in upper position, said adjustable support being foldable to a low position, said block directly supporting said frame in the low position.

3. In an automobile body having front and rear seats normally at an angle to the horizontal, in combination, a seat back, means releasably supporting said seat back in a vertical position, means for releasing said seat back from the vertical position and supporting it in a level substantially horizontal position, means for adjustably individually supporting each of the front and rear seats in their normal position at an angle to the horizontal, or in the same level horizontal position as the released seat back, each of said seat supporting means comprising a frame member hinged at one side and supporting means for the opposite side of said frame member, said supporting means being adapted to support said frame member in either of two adjusted positions, said supporting means comprising a hinged holdable bracket, a block, a latch on said block securing said hinged holdable bracket in upright position said block supporting said frame member in a low position.

HERMAN L. LINDEMANN.